US009061210B2

United States Patent
Chan et al.

(10) Patent No.: US 9,061,210 B2
(45) Date of Patent: Jun. 23, 2015

(54) SYNCHRONIZING AN INSTANCE OF AN APPLICATION BETWEEN MULTIPLE DEVICES

(71) Applicant: NEXTBIT SYSTEMS INC., San Francisco, CA (US)

(72) Inventors: Michael A. Chan, San Francisco, CA (US); Justin Quan, San Francisco, CA (US); Daniel R. Bornstein, San Francisco, CA (US); Tom Moss, Los Altos, CA (US); Linda Tong, San Francisco, CA (US)

( * ) Notice: Subject to any disclaimer, the term of this patent is extended or adjusted under 35 U.S.C. 154(b) by 0 days.

(21) Appl. No.: 14/293,171

(22) Filed: Jun. 2, 2014

(65) Prior Publication Data

US 2014/0287818 A1  Sep. 25, 2014

Related U.S. Application Data

(63) Continuation-in-part of application No. 14/252,555, filed on Apr. 14, 2014, which is a continuation-in-part of application No. 14/221,161, filed on Mar. 20, 2014.

(60) Provisional application No. 61/804,134, filed on Mar. 21, 2013.

(51) Int. Cl.
*G06F 17/30* (2006.01)
*A63F 13/30* (2014.01)

(52) U.S. Cl.
CPC .......... *A63F 13/12* (2013.01); *G06F 17/30575* (2013.01)

(58) Field of Classification Search
None
See application file for complete search history.

(56) References Cited

U.S. PATENT DOCUMENTS

| 8,764,555 | B2 | 7/2014 | Quan et al. |
| 2009/0111378 | A1* | 4/2009 | Sheynman et al. .......... 455/41.1 |
| 2010/0262664 | A1* | 10/2010 | Brown et al. ................. 709/206 |
| 2011/0258160 | A1* | 10/2011 | Lee et al. ...................... 707/626 |
| 2011/0320626 | A1* | 12/2011 | Wong et al. ................... 709/231 |
| 2012/0084803 | A1* | 4/2012 | Johansson et al. ............. 725/25 |
| 2012/0115612 | A1 | 5/2012 | Munakata et al. |
| 2013/0190081 | A1 | 7/2013 | Naik et al. |
| 2014/0094272 | A1 | 4/2014 | Kelly et al. |
| 2014/0128161 | A1 | 5/2014 | Latta et al. |

OTHER PUBLICATIONS

Non-Final Office Action mailed on Sep. 25, 2014, in U.S. Appl. No. 14/252,555, Chan, M.A., et al., filed Apr. 14, 2014.
Notice of Allowance mailed on Nov. 25, 2014, in U.S. Appl. No. 14/252,555, Chan, M.A., et al., filed Apr. 14, 2014.
Notice of Allowance mailed on Dec. 16, 2014, in U.S. Appl. No. 14/252,555, Chan, M.A., et al., filed on Apr. 14, 2014.
Notice of Allowance mailed on Feb. 11, 2015, in U.S. Appl. No. 14/252,555, Chan, M.A., et al., filed on Apr. 14, 2014.

\* cited by examiner

*Primary Examiner* — Alex Gofman (57) ABSTRACT

A technique and apparatus for backing up and restoring game application state across multiple devices are disclosed herein. The method includes running an instance of a game application at a first device. Based on any of various criteria, such as the proximity between the first device and a second device or a priority of synchronization, a computer makes a determination to synchronize the application state between the two devices. The computer causes the application state data, which represents an application state of the game application running on the first device, to be saved and made available to the second device, such as by saving the application state data to cloud storage. The second device receives the application state data and restores the game application state.

19 Claims, 9 Drawing Sheets

SYNCHRONIZING AN INSTANCE OF AN APPLICATION BETWEEN MULTIPLE DEVICES

PRIORITY CLAIM

This application is a continuation-in-part of U.S. patent application Ser. No. 14/252,555, entitled "LOCATION BASED GAME STATE SYNCHRONIZATION", filed on Apr. 14, 2014, which is a continuation-in-part of U.S. patent application Ser. No. 14/221,161, entitled "GAME STATE SYNCHRONIZATION AND RESTORATION ACROSS MULTIPLE DEVICES", filed on Mar. 20, 2014, which claims the benefit of U.S. provisional patent application No. 61/804,134, entitled "OPERATING SYSTEM AND DEVICE INTEGRATED WITH CLOUD COMPUTING FUNCTIONALITIES," filed on Mar. 21, 2013, all of which are incorporated by reference herein in their entirety.

FIELD OF THE INVENTION

At least one embodiment of the present invention pertains to multi-device computing and, more particularly, to automatic backup and restoration of application states across multiple devices.

BACKGROUND

Application state data is data used to record the running status of a computer application. One example of application state data is a game save for a game application. A game save is a piece of digitally stored information related to the progress of a user operating the game application. The game save can be reloaded later so that the user can continue where he stopped. The user instructs the game application to generate a game save (i.e., save the game) to prevent the loss of progress in the game, especially when he is interrupted or is ending a game session.

Sharing and backing up game saves among users has been common for many years. Originally, users could help each other unlock features in a game application by swapping memory cards with game saves. With the growing popularity of the Internet, users started to upload their game saves from their devices to Internet servers. By downloading a game save from an Internet server, a user can continue the progress of the game on the device on which he played the game or on another device, such as a computer, game console, or smart phone. However, to achieve the goal of continuing the progress on another device, the user deliberately needs to instruct the device to save the game progress (i.e., game save) and upload the game save to a server or a memory card. Then the user must download the game from the server or the memory card to the other device and, finally, instruct the other device to load the game save. This process is tedious and requires many user interventions. Furthermore, this process only works for game applications that are specifically designed with game saving functionalities.

SUMMARY

Techniques introduced here provide an automatic mechanism for backing up and restoring application state data across multiple devices. In accordance with the techniques introduced herein, a first instance of a computer application is run by, for example, a distributed system, on the first electronic device and a backup event is determined to occur in the first electronic device. The backup event suggests a backup of application state data, and the application state data represents an application state of the computer application at the backup event and that enables the application state to be duplicated at another device. The application state data can be the minimum set of state data that enables an instance of the computer application running on a first device to be replicated on a second device, such that the instance on the first device and the instance on the second device have the same application state at the time of replication.

The technique further includes a process by which the distributed system stores state data of the first instance of the application and detects a second device upon which the application is installed. Based on various criteria, such as the proximity between the two devices, the distributed system sends the state data to the second device and launches a second instance of the application on the second device. The distributed system then synchronizes the second instance of the application on the second device with the state data received and resumes the second instance of the application on the second device after the synchronization is completed.

The backup proceeds automatically in the background of the operating system of the device and is transparent to the user, as well as the application. The user can restore the application state of the application running on the same device or on another device where the state of the application has been backed up. The application state backup and restoration can be achieved at the operating system level of the devices. There is no special treatment or design needed for the computer application itself. Any computer application capable of running on such an operating system can take advantage of the application state backup and restore functionality. The distributed system can spread among smart phones, tablet computers, desktop computers, and other computing devices.

A distributed system is a collection of independent computing elements stored in a distributed manner that appears to its users as a single coherent system. The function of the single coherent system can be produced by software. The distributed system can spread across a large geographic area since the components of the distributed system can be linked by wired or wireless networks. The distributed system can have better performance compared to a single computing unit and have better fault tolerance than a single computing unit.

The distributed system can enable multiple computing devices to interoperate with one another. In this way, the distributed system can manage multiple computing devices as a single entity. The given application can then be used by any of the computing devices when executing a given application through the distributed system.

For instance, the technology of the distributed system enables the use of user interfaces from a plurality of computing devices to both interact with the distributed system (e.g., through a home screen/desktop of the distributed system) and to also install an application on the distributed system. The application is installed on an application layer of the distributed system, where any of the computing devices being managed by the distributed system can invoke the application installed on the application layer of the distributed system. Thus, a separate installation of the application on each of the computing devices is not required to execute the application through any of the computing devices if the application is installed through the distributed system managing the computing devices.

In one embodiment, an instance of the distributed system is executed using the hardware resources of the multiple computing devices and manages the hardware resources of all the computing devices as a single entity. The various components of the distributed system (e.g., the file system of the distributed system) are stored across the hardware resources of the multiple computing devices. For instance, the data associated with a file system of the distributed system is stored across the memory resources of the various computing devices. The distributed system gathers any required data associated with the file system from across the computing devices when the data are needed for access to the file system.

While the above summary discusses an instance of a computer application being run by a distributed system, the application can be run in any of various ways. For example, the computer application can be run by a computer system, and the techniques described herein that are performed by the distributed system can be performed by the computer system, or by a control application that acts as an interface between the computer application and the computer system, among others.

It is useful now to define a term used in this description. The term "cause" and variations thereof, as used herein, refers to either direct causation or indirect causation. For example, a computer can "cause" an action by sending a message to a second computer that commands, requests or prompts the second computer to perform the action. Any number of intermediary devices may examine and/or relay the message during this process. In this regard, a device can "cause" an action even though it may not be known to the device whether the action will ultimately be executed.

Other aspects of the technology introduced here will be apparent from the accompanying figures and from the following detailed description.

DETAILED DESCRIPTION

References in this specification to "an embodiment," "one embodiment," or the like mean that the particular feature, structure, or characteristic being described is included in at least one embodiment of the present invention. However, occurrences of such phrases in this specification do not all necessarily refer to the same embodiment.

A method of application state synchronization across devices is described herein. For example, a user plays a game on a smart phone then stops playing and turns off the screen of the smart phone. The state of the game application is synchronized between his smart phone and other electronic devices via a cloud system. The user can pick up a tablet computer and continue to play the game from wherever the user left off. The synchronization is not necessarily directly triggered by user intervention. For instance, the synchronization can be automatically triggered when the screen of the smart phone is turned off or the user closes the game on the smart phone. The synchronization proceeds automatically in the background, transparent to the user. Furthermore, the cloud system can analyze a variety of information, including the device profile, user profile, and user history to determine how to optimize when the state is synchronized and to which device the state is synchronized.

Figure 1:
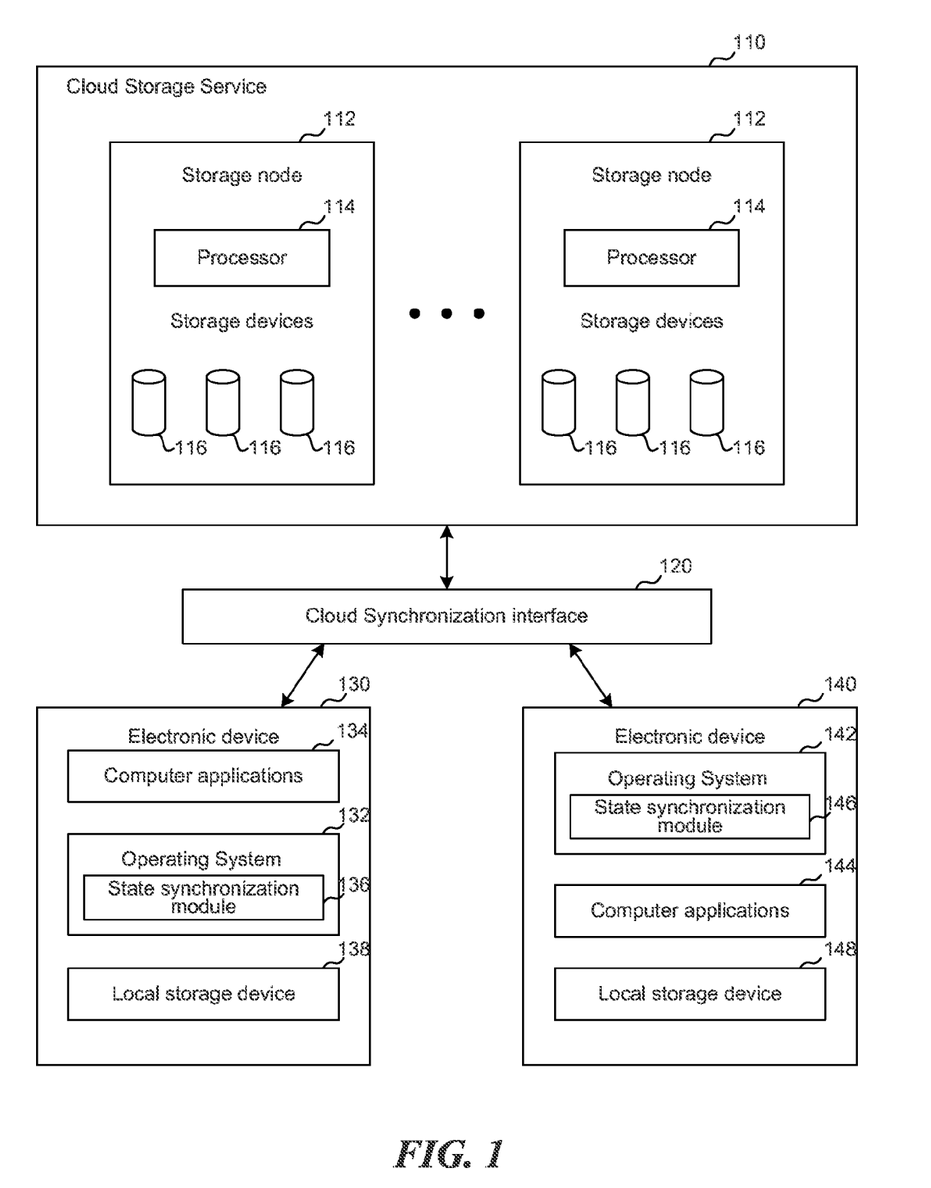
FIG. 1 illustrates an example system for application state synchronization between electronic devices.

FIG. 1 illustrates an example system for application state synchronization between electronic devices. The system includes a cloud storage service 110 configured to store state data for applications. Application state data can alternately, or additionally, be stored at storage devices of computers, such as mobile devices. In one embodiment of the invention, the cloud storage service 110 is a storage cluster having computer nodes interconnected with each other by a network. The storage cluster communicates with other electronic devices via the Internet. The cloud storage service 110 contains storage nodes 112. Each of the storage nodes 112 contains one or more processors 114 and storage devices 116. The storage devices include optical disk storage, RAM, ROM, EEPROM, flash memory, phase change memory, magnetic cassettes, magnetic tapes, magnetic disk storage or any other computer storage medium which can be used to store the desired information.

In one embodiment, a cloud synchronization interface 120 receives data to be stored in the cloud storage service. The cloud synchronization interface 120 includes network communication hardware and network connection logic to receive the information from electronic devices. The network is a local area network (LAN), wide area network (WAN) or the Internet. The cloud synchronization interface 120 may include a queuing mechanism to organize the received synchronization data to be stored in the cloud storage service 110. The cloud synchronization interface 120 communicates with the cloud storage service 110 to send requests to the cloud storage service 110 for storing and retrieving application state data.

An electronic device 130 includes an operating system 132 to manage the hardware resources of the electronic device 130 and provide services for running computer applications 134. The computer application 134 stored in the electronic device 130 requires the operating system 132 to run on the device 130. The electronic device 130 can backup application states of the computer applications 134 to the cloud storage service 110. The electronic device 130 includes at least one local storage device 138 to store the computer applications, application data, and user data. The electronic device 130 can synchronize the application state data with the cloud storage service 110 via the cloud synchronization interface 120. The electronic device 130 or 140 can be a desktop computer, a laptop computer, a tablet computer, an automobile computer, a game console, a smart phone, a personal digital assistant, or other electronic devices capable of running computer applications, as contemplated by a person having ordinary skill in the art.

In one embodiment, the computer applications 134 stored in the electronic device 130 include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the electronic device 130 includes a state synchronization module 136 to backup application state information from the local storage. The state synchronization module 136 keeps the application state data from the electronic device 130 in synchronization with the cloud storage service 110 and other devices.

In one embodiment, another electronic device 140 synchronizes the application state with the cloud storage service 110. The electronic devices 130 and 140 can synchronize the application states between each other via the cloud storage service 110. For instance, the electronic device 130 can synchronize the application state of a computer application to the cloud storage service 110. The cloud storage service 110 communicates with the electronic device 140 to detect whether the electronic device 140 also contains this computer application and whether the application state of this computer application is not updated on the electronic device 140. In turn, the cloud storage service 110 sends the application state data to the electronic device 140. Thus, the application state of this computer application is synchronized between the electronic devices 130 and 140.

In one embodiment, the synchronization for backups from the electronic devices 130 and 140 to the cloud storage service 110 takes place on a configurable periodic basis, such as a predetermined time of day. The scheduled synchronization can also check for updates that can be sent from the cloud storage service 110 to the electronic devices 130 and 140.

In one embodiment, another type of synchronization is triggered when an event occurs on the electronic device 130 or 140, and then the state synchronization module can initialize the application state data synchronization with the cloud storage service 110. The triggered synchronization does not need any intervention from the user. For instance, a user turns off the screen of the electronic device 130 triggering an application state data synchronization with the cloud storage service 110, as well as other electronic devices. However, the user does not need to specifically instruct the device to synchronize; the user does not even need to realize that the synchronization occurs.

In one embodiment, the backup event is any of the following: the screen of the electronic device being turned off; the instance of the computer application being closed; the instance of the computer application being paused; the instance of the computer application having been run continuously for a preconfigured period of time; the instance of the computer application being switched by another application; the instance of the computer application being switched from the foreground to the background of the operating system; the battery level of the electronic device being below a preconfigured value; the electronic device turning off; the electronic device switching to standby mode; the clock of the electronic device reaching a preconfigured time of day; and the electronic device being in a preconfigured location.

In one embodiment, the synchronization is a delta synchronization where the electronic device 130 or 140 detects a change (i.e., delta) of application state data and only the changed data or difference is synchronized to the cloud storage device 110.

Any electronic device running an operating system having the state synchronization module initializes the application state synchronization. In addition, the cloud storage service 110 can also initialize the application state synchronization.

In one embodiment, the cloud storage service 110 may analyze the electronic devices to determine which device is to be synchronized and what state data of which application is to be synchronized.

Figure 2:
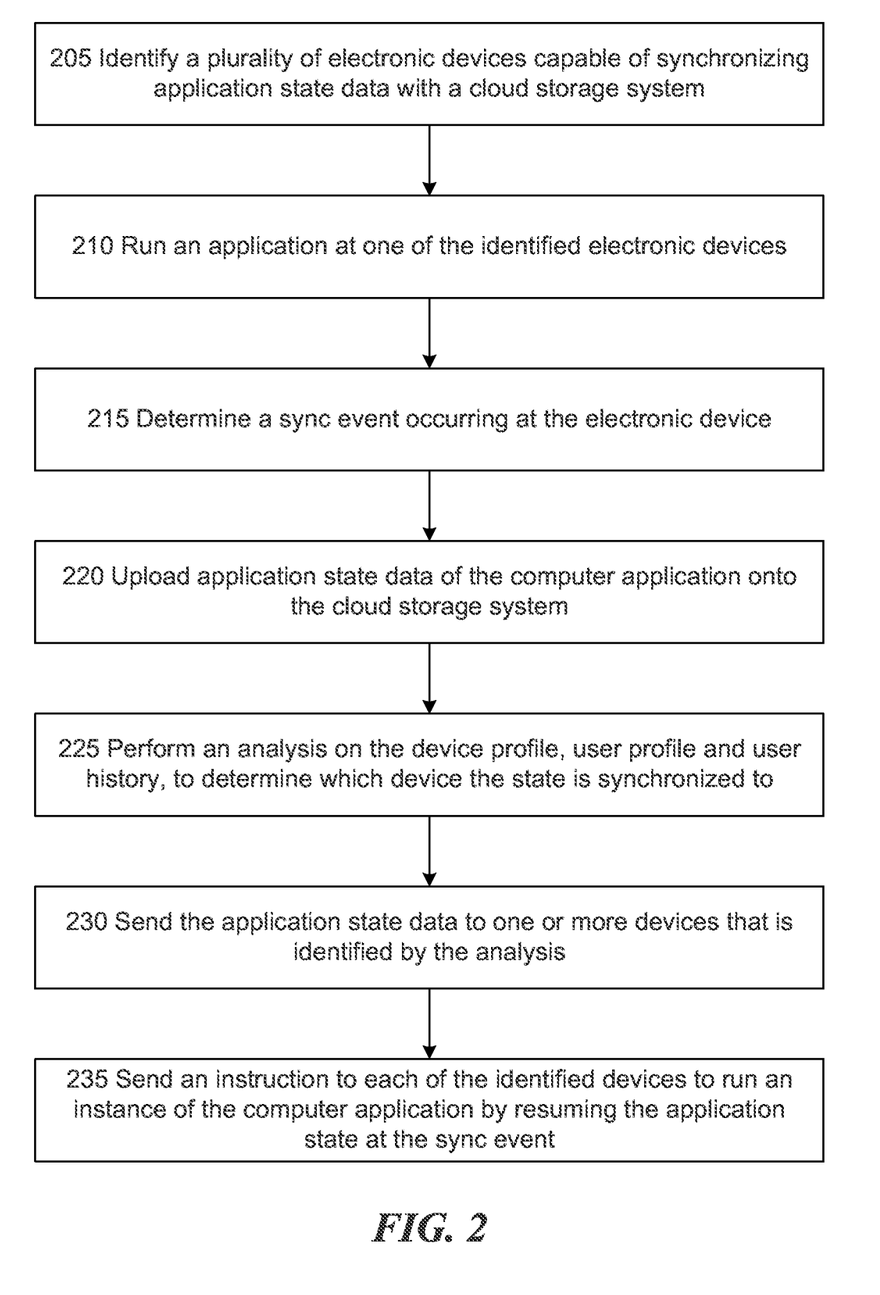
FIG. 2 illustrates an example of an application state synchronization process across multiple electronic devices.

FIG. 2 illustrates an example of an application state synchronization process across multiple electronic devices. At step 205, a cloud storage system identifies a plurality of electronic devices capable of synchronizing application state data with the cloud storage system. The electronic devices may be capable of communicating with the cloud storage system via a network, such as the Internet, a WiFi Network, or a cellular phone network. At step 210, one of the identified electronic devices runs an application.

At step 215, a backup event is determined to occur on the electronic device. The operating system of the electronic device automatically determines the backup event without any intervention, instruction, or awareness from the user. There is no need for a sync button, a sync gesture, a sync menu item, or a sync command. In other words, the operating system of the device determines whether to initiate a backup event. For instance, the operating system may recognize an event of the screen being turned off as a backup event. The operating system may also recognize an event of a running application being closed or being switched by another application as a backup event. The operating system may further recognize an event of a system standby as a backup event. The operating system of the device can determine other types of backup events as contemplated by a person having ordinary skill in the art.

Once the operating system detects a backup event, the operating system of the electronic device uploads the application state data of the computer application onto the cloud storage system at step 220. The operating system of the device decides to immediately upload the application state data after the backup event or start the upload at a certain amount of time after the backup event. For instance, if the electronic device detects that there is another electronic device from the same user in a very close proximity, the operating system of the device may decide to start the upload, assuming a high possibility that the user will start using the other device soon. In another embodiment, the electronic device may decide to start the upload at a certain time of day or at certain location. For instance, the electronic device may decide to start the upload at midnight and at the user's home (determined by GPS location or WiFi location) so that the upload of the application state data does not intervene with the normal operation of the device.

In one embodiment, the developer of the computer application does not specifically need to write any implementation for uploading the application state data. For example, there are no API calls embedded in the computer application for the application state data. The state synchronization module of the operating system is responsible for monitoring, collecting, and uploading the application state data. In some embodiments, the state synchronization module compares the current application state on the device and the application state already stored in the cloud storage service. If the current application state is newer than the application state stored in the cloud storage service, the state synchronization module determines the difference (i.e., delta) between the current application state data and the application state data stored in the cloud storage service. In this way, the state synchronization module only needs to upload the difference to the cloud storage service. The cloud storage service is responsible for incorporating the difference into the application state data already stored.

At step 225, the cloud storage system analyzes the device profile, user profile and user history to determine which device the state is synchronized to. For instance, in one embodiment, the cloud storage system recognizes the various devices that the same user is using (e.g., the devices which have established the user's user account). In another embodiment, the analysis is based on usage pattern. For example, the cloud storage service can determine whether to synchronize the application state to devices that the user has been frequently using during a specific time period (e.g., a week), or the cloud storage service can determine whether to synchronize the application state to devices on which the user has been running that computer application. In yet another embodiment, the analysis is based on a proximity-based synchronization algorithm. For example, the cloud storage service can determine to synchronize the application state to devices that are physically close to the device in step 210. The proximity may be determined by GPS locations, WiFi network locations, cellular networking locations or any combination thereof. In still another embodiment, the analysis is based on the types of applications installed on the devices. For example, the cloud storage service can determine to synchronize the application state to devices that have instances of that application installed or devices that have similar applications installed. Furthermore, the analysis can be determined by a combination of the above techniques, as well as any other device or user information as contemplated by a person having ordinary skill in the art.

The same types of analysis disclosed in the previous paragraph are used in determining the priority of synchronization. For instance, if there is an application state data synchronization for multiple applications in the cloud storage service, the cloud storage service may determine whether to synchronize the state data for one application because the user has been frequently using that application during a recent time period (e.g., a week). In one embodiment, the cloud storage service decides a priority list, including a reference to the application state data for the computer application, wherein the priority list regulates the order of transmitting the application state data for the computer application and data for other applications based on the analysis of the user profile and the hardware profiles of the electronic devices.

In some embodiments, the analysis is performed after the cloud storage system receives application state data from a device. In some other embodiments, the analysis can be performed before the cloud storage system receives any application state data or before the backup event occurs.

At step 230, the cloud storage system sends the application state data to one or more devices that are identified by the analysis. The identified devices receive the application state data. Therefore, the instances of the application running on the devices are synchronized with the most up-to-date state. A user can run an instance of the application on any of these devices, and the instance of the application resumes from the most up-to-date state. In one embodiment, the cloud storage system further sends an instruction to each of the identified devices to run an instance of the computer application by resuming the application state at the backup event at step 235.

In one embodiment, the application state data of a computer application may include application memory data, application local storage data, hardware configuration data, and user account configuration data. The state synchronization module of the operating system is capable of collecting this data and uploading the data as included in the application state data to the cloud storage service. Based on the application state data, an operating system of another electronic device can recreate the same environment and status of the application on the other electronic device.

In some embodiments, the electronic devices are capable of synchronizing application state data between each other via a network, such as a WiFi network, a Bluetooth network, or a cellular phone network. Each of the electronic devices contains a network component configured to synchronize the application state data with another electronic device.

Figure 3:
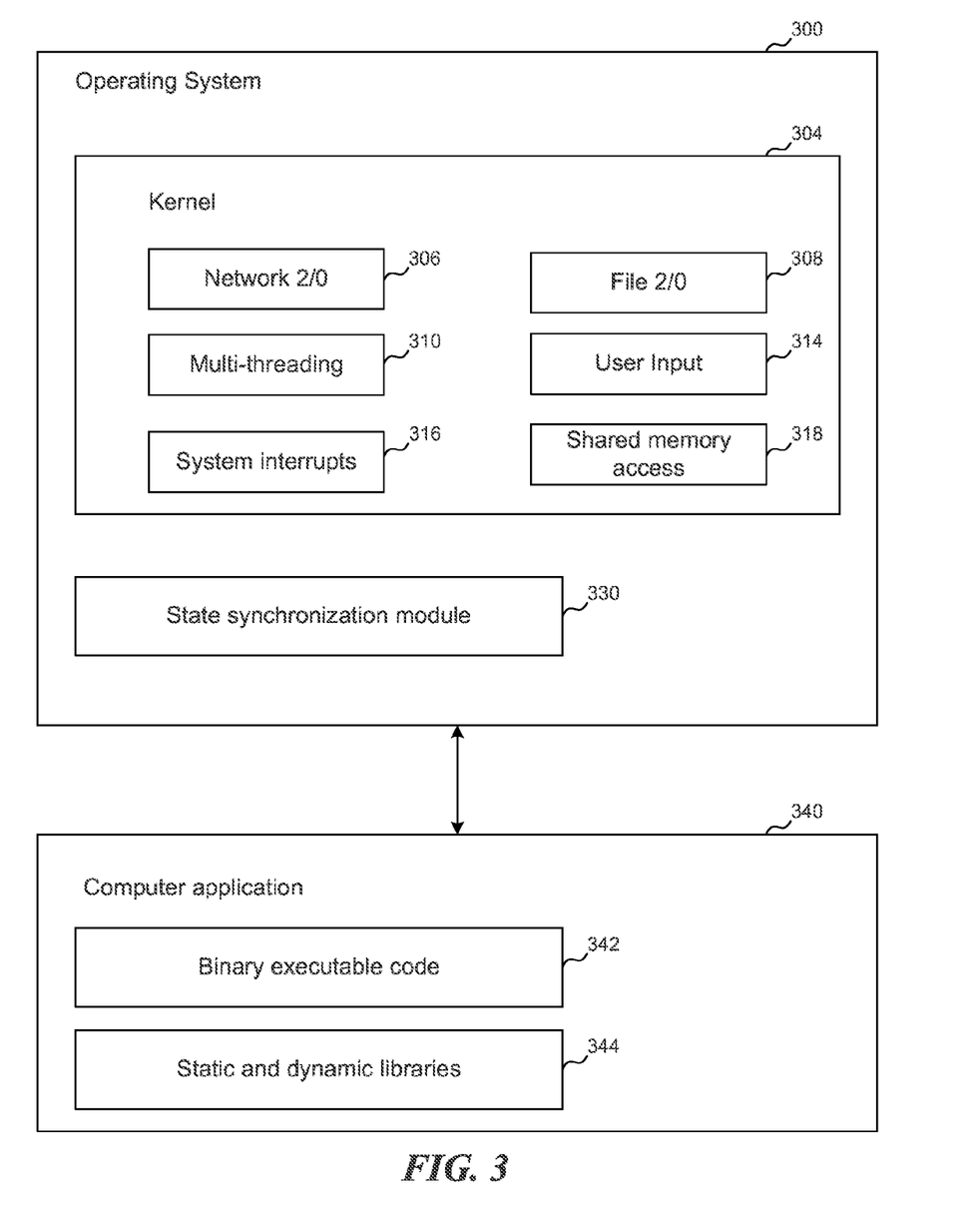
FIG. 3 illustrates an example operating system of an electronic device.

FIG. 3 illustrates an example of an operating system of an electronic device, according to one embodiment. The operating system 300 includes a kernel 304. The kernel 304 provides interfaces to hardware of the electronic device for the computer applications running on top of the kernel 304 and supervises and controls the computer applications. The kernel 304 isolates the computer applications from the hardware. The kernel 304 may include one or more intervening sources that can affect execution of a computer application. In one embodiment, the kernel 304 includes a network I/O module 306, a file I/O module 308, multi-threading module 310, user input 314, system interrupts 316, and shared memory access 318.

A state synchronization module 330 runs on top of the kernel 304. The state synchronization module 330 monitors the information from the intervening sources of the kernel 304 and records state data according to the information. In the example of FIG. 3, a computer application 340 includes a binary executable code 342 that can run in the background of the operating system 300. The computer application 340 can further include static and dynamic libraries 344 that are referenced by the binary executable code 342 while an application is running. In one embodiment, the state synchronization module 330 runs in a user space file system (e.g., FUSE) in the background of a Linux kernel. In another embodiment, the state synchronization module 330 runs in a kernel file system.

Figure 4:
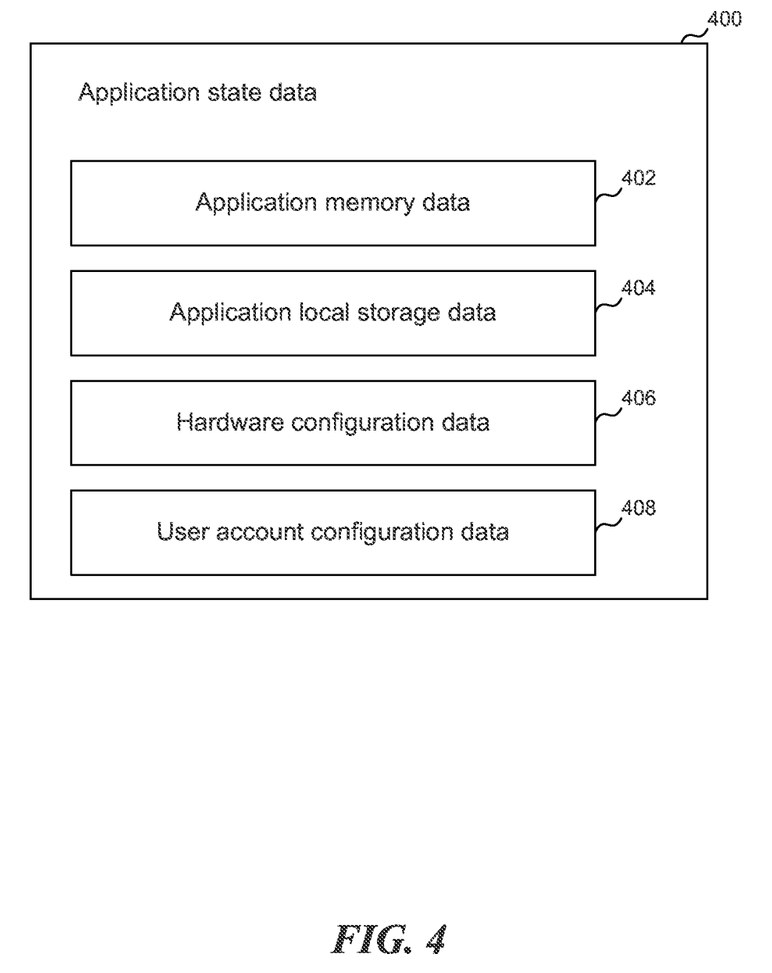
FIG. 4 illustrates an example of an application state data of a computer application collected by an operating system.

FIG. 4 illustrates an example of an application state data of a computer application collected by an operating system, according to one embodiment. The application state data 400 of a computer application may include application memory data 402, application local storage data 404, hardware configuration data 406, and user account configuration data 408. In some other embodiments, the application state data can be all or any combination of fields 402, 404, 406 and 408. When the computer application is running, the state information in the memory section (i.e., the application memory data 402) allocated for the application is updated by the running application. The state synchronization module of the operating system monitors the application memory data 402 and uploads the data to a cloud storage service in response to the backup event. Furthermore, the computer application can update certain data on the local storage of the electronic device. The state synchronization module of the operating system can include the application local storage data 404 synchronized with the application state data 400. In some embodiments, the electronic device includes a memory device (e.g., flash memory) as both the memory and the local storage. Therefore, the application memory data 402 and application local storage data 404 can be one section of data in the memory device of the electronic device.

The application state data 400 may further include hardware configuration data 406. For instance, the state synchronization module may record the current device's volume level and screen brightness level when the application is running. The device's volume level and screen brightness level are recorded as part of the hardware configuration data 405 and are uploaded to the cloud storage service. Therefore, after another device is synchronized with the application state data and resumes running the application, the other device automatically adjusts the volume level and screen brightness level to match the level on the previous device. Moreover, the application state data 400 may include user account configuration data 408. The user account configuration data 408 may include the user's preferences and choices regarding the computer application and the operating system environment for running the computer application. For instance, the user account configuration data 408 may include information about the user's language preference. Assuming the computer application is a game that supports both English and Chinese languages and the user has selected English as the preferred language, the state synchronization module records the user's language preference as a part of the user account configuration data 408. The user account configuration data 408 is synchronized to another device via the cloud storage service. When the other device resumes running the application, the application will use the English language for the game interface, as indicated by the user account configuration data 408.

Figure 5A:
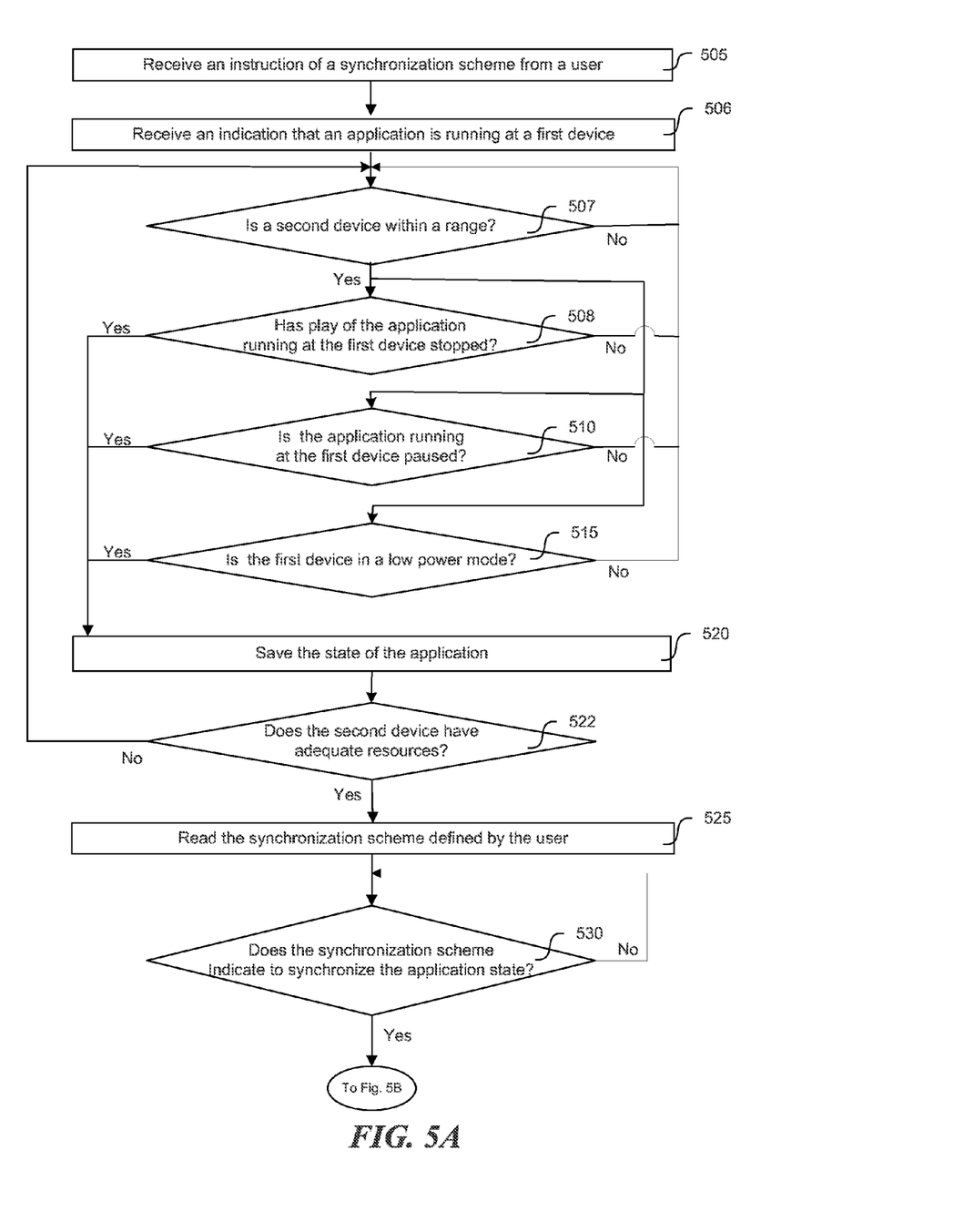
FIG. 5A and FIG. 5B illustrate an example of an application state synchronization process based on a user-defined synchronization scheme.
Figure 5B:
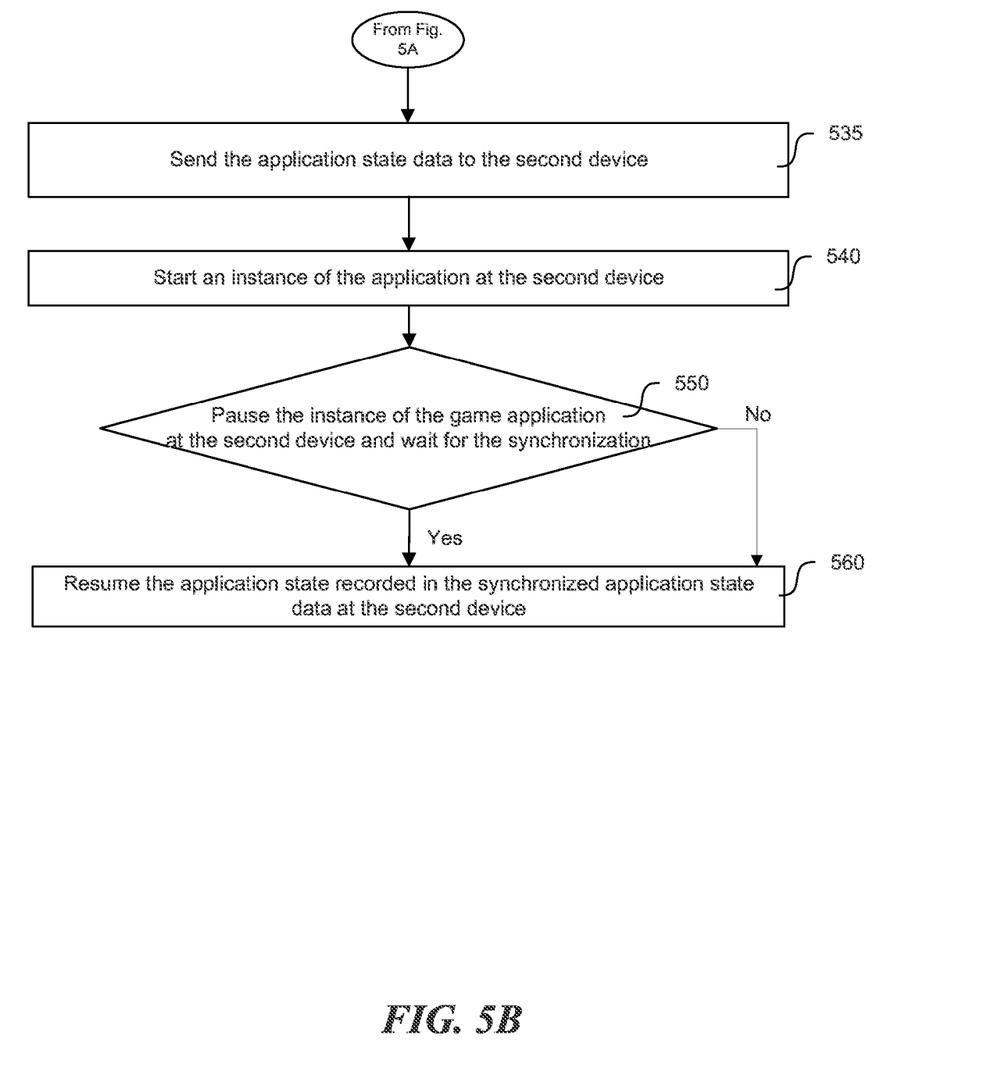
Figure 8:
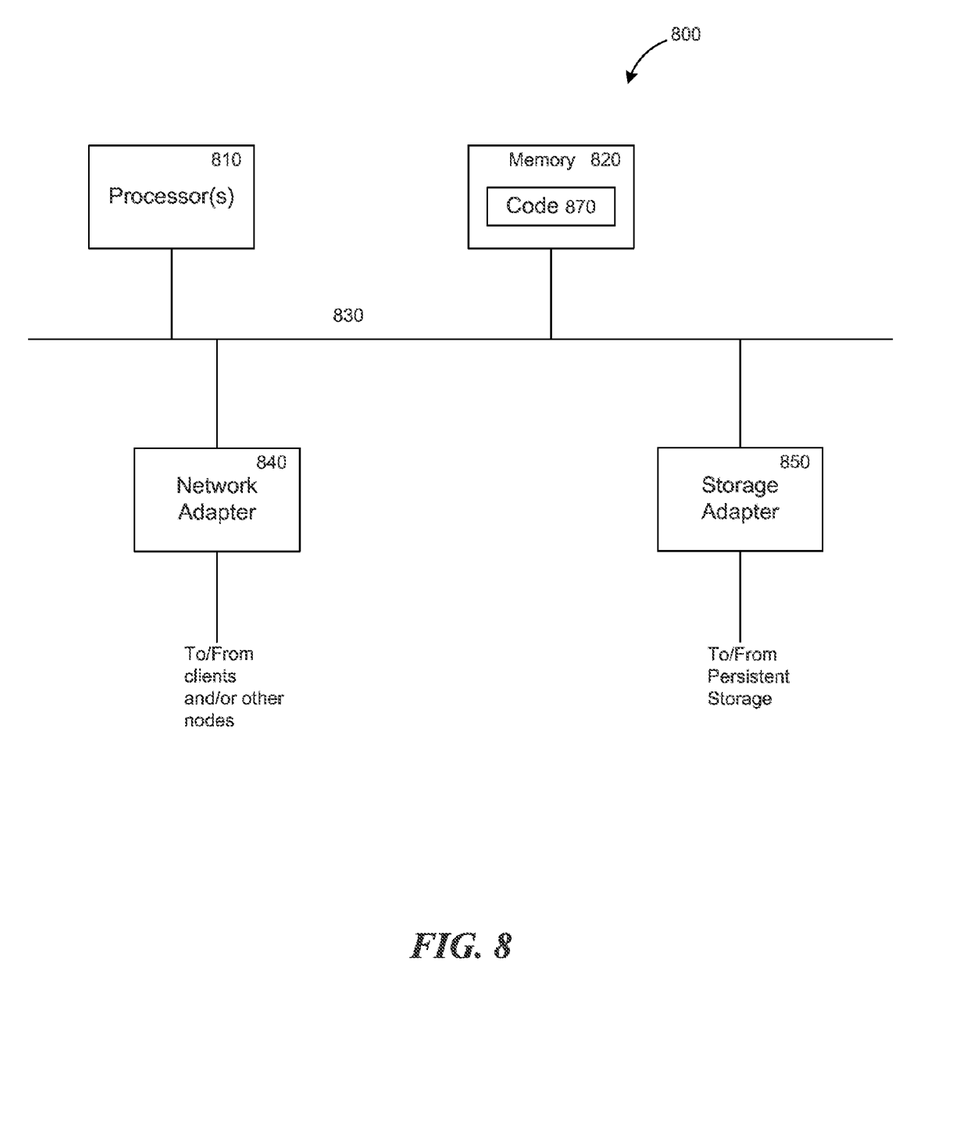
FIG. 8 is a high-level block diagram showing an example of the architecture of a computer server, which may represent any computer running the database management system described herein.

In some embodiments, a user can define a synchronization scheme, such as via commands, instructions, preferences, etc. added to the user profile, to control how and when the synchronization process occurs. The synchronization scheme can utilize a proximity-based synchronization algorithm. FIG. 5 illustrates an example of an application state synchronization process based on a user defined synchronization scheme. The process involves synchronizing application state data between two computers, which in the following example are a referred to as a first device and a second device, and which can be two of computer 800. A computer such as computer 800 can perform the steps of the process. In the following example, the device performing the steps of the process is a smart phone. Further, the smart phone can be the first device (i.e. the device whose state will be synchronized with the second device), or can be controlling the synchronization of an application state from a first device to a second device.

At step 505, a computer, which can be a cloud storage service server, receives information related to a synchronization scheme from a user. The synchronization scheme information includes rules defining how and when the synchronization process is performed. For example, the synchronization scheme can define a synchronization rule between two electronic devices, e.g., a smart phone and a tablet computer, that defines when to synchronize application state data of a game application between the two electronic devices. The synchronization rule, for example, can specify to synchronize the application state data from a first electronic device to a second electronic device as soon as the game application on the first electronic device is closed or the screen of the device is turned off.

At step 506, a smart phone receives an indication that an application is running at a first device. For example, when the first device is the smart phone, the smart phone can receive a request to initiate the application. When the first device is another computer, the smart phone can receive a message from the application while the application is running on the other computer. At step 507, the smart phone checks whether a second device is within a range of the first device. The second device being within a particular range of the first device indicates that a user may decide to transition from running the application at the first device to running the application at the second device.

The range can be any of various ranges. For example, the range can be a predefined distance of separation between the first device and the second device ("the two devices"), the two devices being at the same location (e.g. at the same residence, at the same business, within a geo-fence, etc.), the two devices being within direct short range wireless communication range of each other, etc. A geo-fence is a virtual perimeter of a geographic area and can be dynamically generated, such as a radius around a store or point location, a predefined set of boundaries, such as a boundary that follows the external walls of a business, a home, a property, etc.

Direct short range wireless communication can involve communication via, for example, Bluetooth low energy (BLE), near field communication (NFC), or a wireless local area network (WLAN). The WLAN can be any of the various types of IEEE 802.11 networks. A short-range wireless network does not include a cellular telecommunication network. Direct short-range wireless communication between a first device and a second device can involve, for example, a wireless signal being sent directly from the first device to the second device, without going through any intervening devices.

An illustrative use case for determining if a second device is within a range of a first device starts with the first device receiving an indication that the second device is within short range wireless communication range of the first device. The indication can be, for example, a message received via short range wireless communication between the two devices, or an indication that the distance of separation between the two devices is less than the range of short range wireless communication, or the two devices both having access to the same WLAN, among others.

Because a purpose of the technology is to enable a user to transition from running an application at a first device to running the application at a second device, the smart phone can check to make sure that the application is installed at the second device. For example, the smart phone can send a message to the second device to determine if the application is installed at the second device, and the second device can respond with an appropriate response.

A decision to enable a transition between the two devices can be based on a proximity-based synchronization algorithm which can include a determination of the proximity between the two devices. For example, the first device can receive location information, such as global positioning system (GPS) coordinates, from the GPS receivers of the two devices. The smart phone can use the two GPS coordinates to determine the proximity, such as by determining the separation distance between the two devices, by determining that the two devices are within a geo-fence, etc. As another example, the location information can be a message received via short range wireless communication between the two devices, and the proximity can be that the two devices are within direct short range communication range. As yet another example, the location information can be an indication that the two devices can both communicate via the same IEEE 802.11 WLAN at substantially the same time, and the proximity can be that the two devices are within range of the WLAN. As one more example, the location information can be GPS coordinates from the two devices, and the proximity can be an indication that the two devices are both within a same geo-fence at substantially the same time.

Further, the proximity-based synchronization algorithm can be based on commands, instructions, preferences, etc. stored in, e.g., the user profile. For example, the user can indicate a preference to use device 1 over device 2 when device 1 and device 2 are within a predefined proximity of each other. When device 1 and device 2 are within the predefined proximity, the proximity-based synchronization algorithm can schedule and initiate a transfer of application state data from device 1 to device 2 to enable a transition from running an instance of an application on device 2 to running an instance of the application on device 1.

Returning to the diagram of FIG. 5, if no second device is determined to be within the range, the search for a second device continues. If a second device is determined to be within the range, further checks can be performed to determine if a user transition from running the application at the first device to running the application at the second device is likely to happen. In various embodiments, the process of FIG. 5 includes none, any, or all of steps 508-515. Transitioning to step 520 can involve any or all of steps 508-515 having a positive determination.

At step 508, the smart phone checks whether a user has stopped using the application, which may indicate that a user is about to transition to running the application on the second device. For example, when the first device is the smart phone, the smart phone can receive data from an embedded motion sensing device which indicates that the smart phone has stopped moving. As another example, the smart phone can receive data indicating that the smart phone is being powered off or being put in a low power state, or data indicating that a screen lock has started on the smart phone. If the smart phone determines that no users are currently using the application, the process can continue at step 520. Otherwise, the process can continue at step 507, 510, or 515, At step 510, the smart phone checks whether the game application running at the first device is paused, which indicates that a user may transition to running the application on the second device. If the game application is paused, the process can continue at step 520. Otherwise, the process can continue at step 507, 508, or 515. At step 515, the smart phone checks whether the smart phone is in a low power mode. For example, the user may have turned off the screen, or the device may have entered a low power mode due to inactivity, which indicates that the user may transition to running the application on the second device. If the smart phone is in a low power state, the process can continue at step 520. Otherwise, the process can continue at step 507, 508, or 510.

At step 520, the smart phone saves the state of the application. For example, the smart phone can upload the application state data of the game application to the cloud storage system. The schedule of the uploading can depend on the type and speed of the connection between the smart phone and the cloud storage system. For instance, the schedule can be configured so that the uploading is delayed until a WiFi connection is available to avoid using a cellular data connection (e.g., 3G or LTE).

At step 525, the smart phone determines whether the second device has adequate resources to run the application. In order to transition from running the application on the first device to running the application on the second device, the second device needs to have adequate resources to run the application. The second device may need, for example, adequate memory, adequate storage space, a particular component, adequate performance of a particular component, etc., to run the application effectively.

At step 530, the smart phone determines whether the synchronization scheme indicates to synchronize the application state between the first device and the second device. The synchronization scheme can indicate to synchronize the application state when any of various events occur or based on any of various data. For example, the synchronization scheme can indicate to synchronize the application state when any or all of steps 507, 508, 510, 515, or 522 evaluate positively. As another example, the synchronization scheme can indicate to synchronize the application state when there is a likelihood, based on a past history of usage of the application on the first device and the second device, that the user will transition to running the application on the second device.

For example, the past history can indicate that when a user is running an application on his smart phone and he arrives home, he shortly transitions to running the application on his tablet. Or the part history can indicate that the user keeps running the application on the smart phone for a while after he gets home, and doesn't transition until shortly after he stops using his smart phone, as indicated by the smart phone becoming very still (as indicated by a motion sensor in the smart phone). If step 530 evaluates positively, at step 535 the smart phone causes the first device to send the application state data to the second device. When the first device is the smart phone, the smart phone can send the application state data to the second device. When the first device is another computer, the smart phone can send a message to the other computer than prompts the other computer to send the application state data to the second device. The application state data can be sent according to the synchronization state scheme.

At step 540, when the user starts to use the second device, the second device runs an instance of the game application. At step 550, the smart phone checks whether the user pauses the application of the game application. If the user pauses the application, the smart phone can cause the synchronization to happen. In step 560, the smart phone can cause the application to be resumed, based on the application state data.

Figure 6:
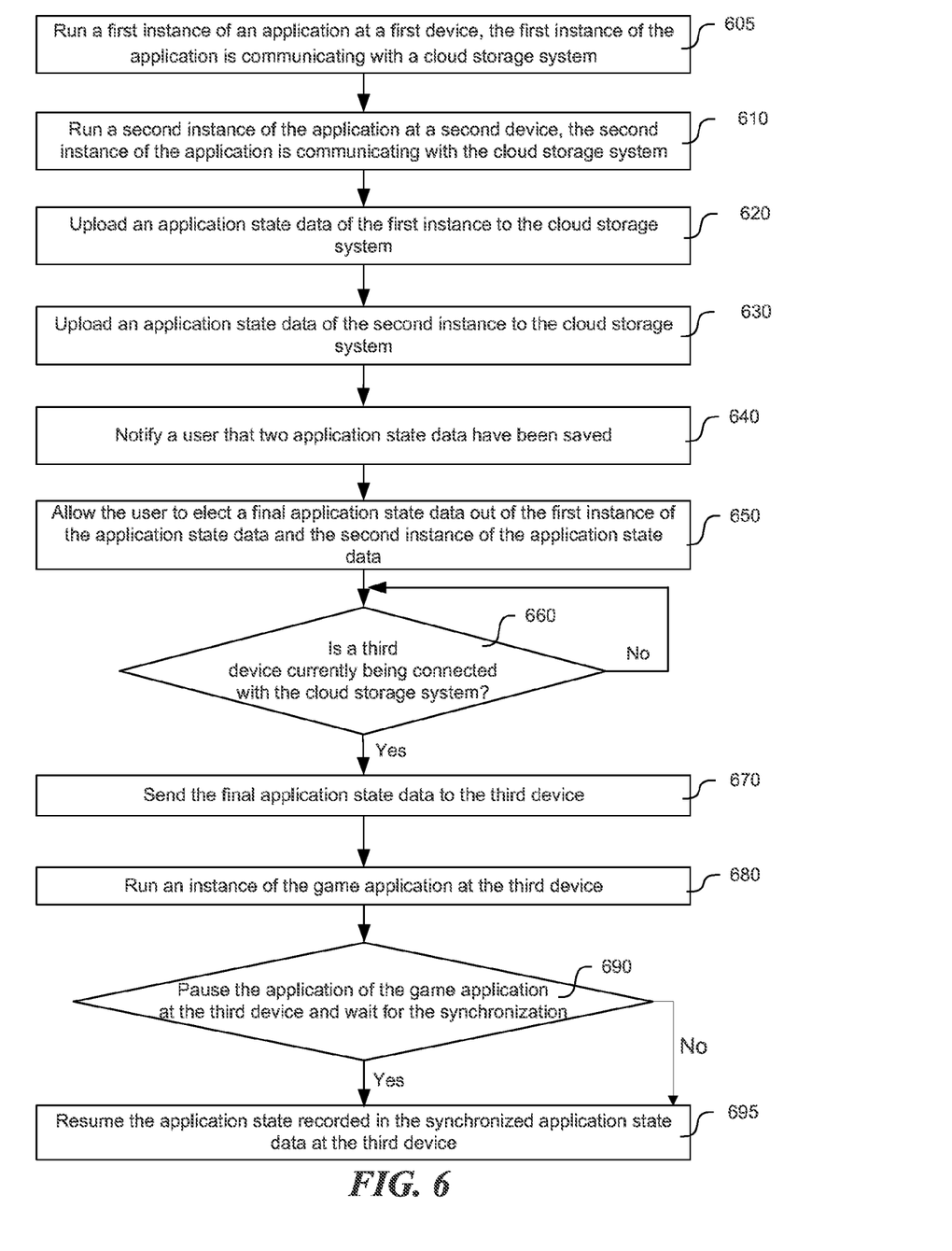
FIG. 6 illustrates an example of multiple application state backup and restoration processes where a user can select whichever application state the user wants to restore.

FIG. 6 illustrates an example of multiple application state backup and restoration processes where a user can select which application state he/she wants to restore to. At step 605, the distributed system runs a first instance of an application on the first electronic device. The first electronic device can be a smart phone, a tablet, or any other computing device. The first instance of the application is communicating with a cloud storage system that is a part of the distributed system. At step 610, the distributed system runs a second instance of an application on a second electronic device. The second electronic device can be a smart phone, a tablet, or any other computing device. The second instance of the application is communicating with a cloud storage system that is a part of the distributed system.

At step 620, the first electronic device uploads the application state data of the computer application to a remote storage service. The remote storage service can be a cloud computing service. Alternatively, the remote storage service belongs to a cloud storage service cluster. The first electronic device is capable of transmitting the application state data to the remote storage service via a network, which can include the Internet, a WiFi network, or a cellular phone network. In one embodiment, the first electronic device can immediately transmit the application state data of the computer application to a remote storage service in real time without a substantial delay.

The application state data of the computer application can be transmitted to the remote storage service at a preconfigured time of day or when the first electronic device is at a preconfigured location. In some embodiment, the application state data of the computer application can be transmitted to the remote storage service based on a sync score that would have an optimization scale built in. The optimization scale can be calculated based on a predetermined formula with inputs such as network speed, location of the devices, number of the devices, time of day. Alternatively, the application state data of the computer application can be transmitted to the remote storage service at a scheduled time depending on the type and speed of the connection between the first electronic device and the remote storage service in response to the backup event. The schedule can be preconfigured to avoid using a cellular data connection so that the transmitting is delayed until a WiFi connection is available. The backup can be incremental. For instance, the difference between the application state data of the computer application and previously transmitted application state data can be transmitted to a remote storage service in response to the backup event.

At step 630, the second electronic device uploads the application state data of the computer application to a remote storage service. The remote storage service can be a cloud computing service. Alternatively, the remote storage service can belong to a cloud storage service cluster. The second electronic device is capable of transmitting the application state data to the remote storage service via a network, which can include the Internet, a WiFi network, or a cellular phone network. In one embodiment, the second electronic device can immediately transmit the application state data of the computer application to a remote storage service in real time without a substantial delay.

The application state data of the computer application can be transmitted to the remote storage service at a preconfigured time of day or when the second electronic device is at a preconfigured location. Alternatively, the application state data of the computer application can be transmitted to the remote storage service at a scheduled time depending on the type and speed of the connection between the second electronic device and the remote storage service. The schedule can be preconfigured to avoid using a cellular data connection so that the transmitting is delayed until a WiFi connection is available. The backup can be incremental. For instance, the difference between the application state data of the computer application and the previously transmitted application state data can be transmitted to a remote storage service in response to the backup event.

At step 640, the distributed system can notify a user that two instances of the application state data have been saved. This notification can be sent through a network, such as a WiFi network or a cellular phone network. At step 650, the distributed system can allow the user to elect a final application state data out of the first instance of the application state data and the second instance of the application state data. In some embodiments, the user can make the selection through the first electronic device. In some embodiments, the user can make the selection through the second electronic device. In some embodiments, the user can make the selection through a terminal coupled to the distributed system.

At step 660, the cloud storage system checks whether a third device (i.e., a desktop computer) is currently connected with the cloud storage system. If the desktop computer is connected with the cloud storage system, at step 670, the system sends the application state data to the desktop computer. Otherwise, the cloud storage system continues to check the connection with the desktop computer on a periodic basis. At step 680, when the user starts to use the desktop computer, the desktop computer starts to run an instance of the game application. At step 690, the distributed system checks whether the user pauses the application of the game application and waits for the synchronization process to be finished. If the user pauses the application, the distributed system can wait for the synchronization, and then in step 695, the distributed system can resume the application state recorded in the synchronized application state data at the desktop computer.

Figure 7:
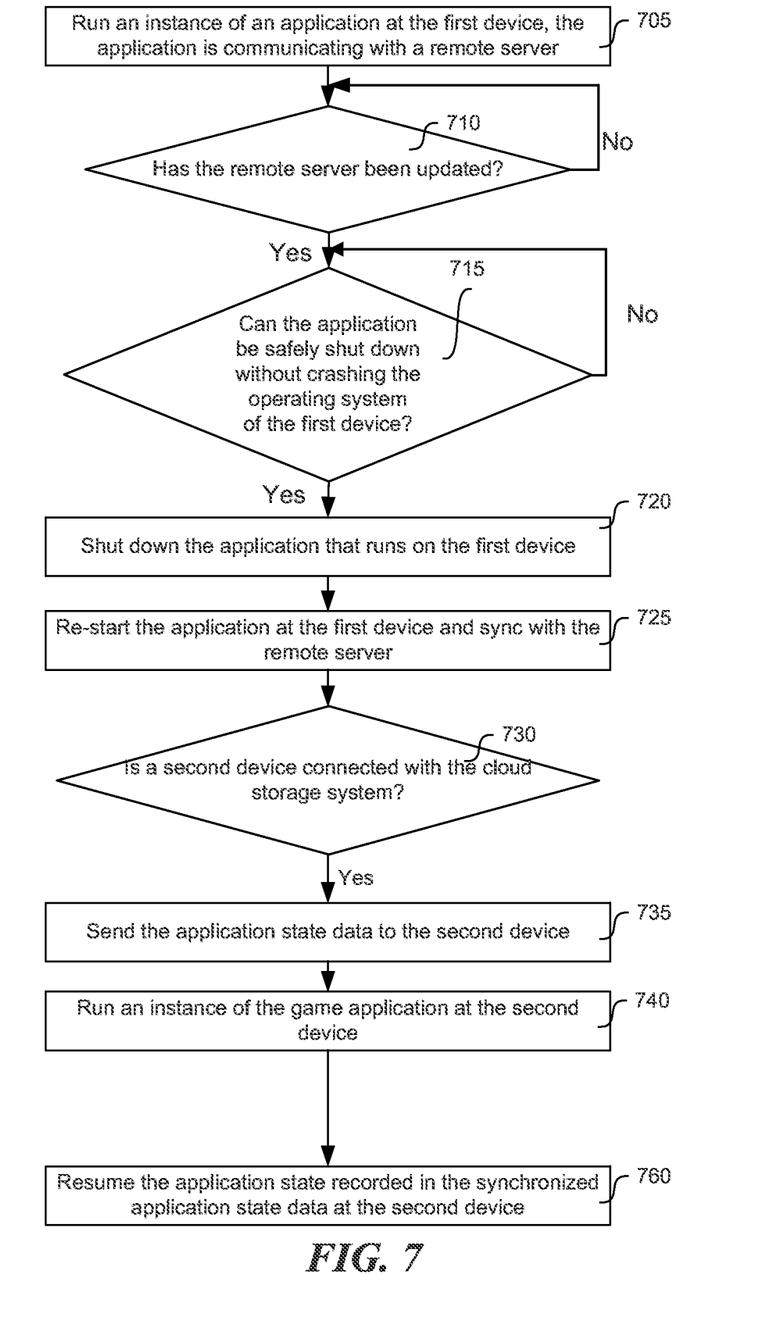
FIG. 7 illustrates an example of an application state synchronization process when an update occurred at a remote storage server.

FIG. 7 illustrates an example of an application state synchronization process when an update occurred at a remote storage server. At step 705, the distributed system runs a first instance of an application on the first electronic device. The first electronic device can be a smart phone, a tablet or any other computing device. The first instance of the application is communicating with a cloud storage system that is a part of the distributed system. At step 710, the distributed system checks whether the remote server has been updated. If the remote server has been updated, at step 715, the distributed system checks whether the application at the first device can be safely shut down without crashing the operating system of the first device. If the application can be safely shut down and the remote server has been updated, at step 720, the distributed system shuts down the application that runs on the first device. If the remote server has not been updated or the application cannot be safely shut down, the distributed system will check step 710 and 715 again.

At step 725, the distributed system can restart the application at the first device and sync with the remote server. At step 730, the distributed system checks whether a second device connected with the cloud storage system. If there is a second device connected with the cloud storage system, at step 735, the distributed system can send the application state data to the second device. At step 740, the distributed system can run an instance of the game application at the second device. At step 760, the distributed system can resume the application state recorded in the synchronized application state data on the second device.

FIG. 8 is a high-level block diagram showing an example of the architecture of a computer, which may represent any electronic device or any server described herein. A computer can be a mobile device, such as a smart phone, a tablet computer, a portable media device, a wearable computing device, a laptop, etc. The server 800 includes one or more processors 810 and memory 820 coupled to an interconnect 830. The interconnect 830 shown in FIG. 8 is an abstraction that represents any one or more separate physical buses, point-to-point connections, or both connected by appropriate bridges, adapters, or controllers. The interconnect 830, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The processor(s) 810 is the central processing unit (CPU) of the server 800, and thus, controls the overall operation of the server 800. In certain embodiments, the processor(s) 810 accomplishes this by executing software or firmware stored in memory 820. The processor(s) 810 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 820 is, or includes, the main memory of the server 800. The memory 820 represents any form of random access memory (RAM), read-only memory (ROM), flash memory, or the like, or a combination of such devices. In use, the memory 820 may contain a code 870, containing instructions according to the techniques disclosed herein.

Also connected to the processor(s) 810 through the interconnect 830 are a network adapter 840 and a storage adapter 850. The network adapter 840 provides the server 800 with the ability to communicate with remote devices over a network and may be, for example, an Ethernet adapter or Fibre Channel adapter. The network adapter 840 may also provide the server 800 with the ability to communicate with other computers. The storage adapter 850 allows the server 800 to access a persistent storage and may be, for example, a Fibre Channel adapter or SCSI adapter.

The code 870 stored in memory 820 may be implemented as software and/or firmware to program the processor(s) 810 to carry out actions described above. In certain embodiments, such software or firmware may be initially provided to the server 800 by downloading it from a remote system through the server 800 (e.g., via network adapter 840).

The techniques introduced herein can be implemented by, for example, programmable circuitry (e.g., one or more microprocessors) programmed with software and/or firmware, by special-purpose hardwired circuitry, or by a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.).

The term "logic", as used herein, can include, for example, circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting, and the appended claims are to be interpreted as encompassing the true spirit and the entire scope of the invention.

What is claimed is:

1. A method for synchronizing application instances between multiple devices, comprising:
    receiving an indication, by a computer system, that a first instance of an application is being run at a first mobile device, the first mobile device being one of a plurality of devices that are associated with a user, the plurality of devices including a second mobile device;
    accessing a storage device, by the computer system, to obtain user profile data associated with a user profile of the user, the user profile data including proximity algorithm data that is based on input from the user, and that is utilized by a proximity-based synchronization algorithm to customize the proximity-based synchronization algorithm, the user profile data further including user history data that indicates that the user switches from the first mobile device to the second mobile device when the first mobile device is physically close to the second mobile device;
    performing an analysis, by the computer system, that utilizes the proximity-based synchronization algorithm, the user profile data, and an indication of a location of the first mobile device or the second mobile device, and that produces an analysis result;
    determining a priority of synchronization, by the computer system, wherein the priority of synchronization is based on the user profile data and the analysis result;
    determining a schedule to synchronize, based on the priority of synchronization, application state data of the first instance of the application, the determination of the schedule made by the computer system, the application state data being state data of the first instance of the application that enables the first instance of the application to be replicated at another device; and
    in response to meeting the schedule to synchronize the application state data, causing, by the computer system, the application state data to be transferred from the first mobile device to the second mobile device to enable a second instance of the application to be initiated, based on the application state data, at the second mobile device.

2. The method of claim 1, wherein the application state data is transferred from the first mobile device to the second mobile device via one or more intermediary devices.

3. The method of claim 2, wherein an intermediary device of the one or more intermediary devices is a cloud storage server, and wherein the application state data is stored at the cloud storage server.

4. The method of claim 1, wherein the application state data is transferred via direct short-range wireless communication between the first mobile device and the second mobile device.

5. The method of claim 1, further comprising:
    determining which state data of the first instance of the application changed between a first saved state that corresponds to a first point in time, and a second state that corresponds to a second point in time,
    wherein said determining indicates that the state data that changed between the first saved state and the second state is a portion of the state data, the portion being less than all of the state data, and
    wherein the application state data is a delta synchronization that includes the portion of the state data, and does not include all of the state data.

6. The method of claim 1, wherein the application state data includes any of memory data of the first instance of the application, local storage data of the first instance of the application, hardware configuration data, or user account configuration data.

7. The method of claim 1, further comprising:
    receiving an indication that the second instance of the application was initiated, based on the application state data, at the second mobile device.

8. The method of claim 1, further comprising:
    causing the second instance of the application to be initiated, based on the application state data, at the second mobile device.

9. The method of claim 1, wherein the computer system is one of the first mobile device or the second mobile device.

10. The method of claim 1, wherein the first mobile device is any one of a smart phone, a tablet computer, a portable media device, a wearable computing device, or a laptop, and wherein the second mobile device is any one of a smart phone, a tablet computer, a portable media device, a wearable computing device, or a laptop.

11. The method of claim 1, wherein the indication of the location is any of a global positioning system (GPS) coordinate, a message being sent via direct short range wireless communication between the first mobile device and the second mobile device, a name of a WLAN to which the first mobile device has access, or an indication that the first mobile device is within a geo-fence.

12. A method comprising:
- receiving an indication, by a computer system, that a first instance of an application is being run at a first mobile device, the first mobile device being one of a plurality of devices that are associated with a user, the plurality of devices including a second mobile device;
- obtaining, by the computer system, user profile data that is associated with a user profile of the user, and user history data that includes data that indicates historic usage by the user of at least one of the first mobile device or the second mobile device, wherein the user profile data includes proximity algorithm data that is associated with a proximity-based synchronization algorithm, wherein the user history data indicates that the user switches from the first mobile device to the second mobile device when the first mobile device is physically close to the second mobile device;
- performing an analysis, by the computer system, to determine a priority of synchronization, wherein the analysis is based on the user history data, the proximity-based synchronization algorithm, the proximity algorithm data, and an indication of a location of one or both of the first mobile device or the second mobile device;
- determining a schedule to synchronize, based on the priority of synchronization, application state data of the first instance of the application, the determination of the schedule made by the computer system, the application state data being state data of the first instance of the application that enables the first instance of the application to be replicated at another device; and
- in response to meeting the schedule to synchronize the application state data, causing the application state data to be transferred from the first mobile device to the second mobile device to enable a second instance of the application to be initiated, based on the application state data, at the second mobile device.

13. The method of claim 12, wherein said at least one of the first mobile device or the second mobile device is the first mobile device, and wherein said one or both of the first mobile device or the second mobile device is the second mobile device.

14. The method of claim 12, wherein the priority of synchronization of the second mobile device is higher than the priority of synchronization of a selected device of the plurality of devices when the second mobile device is physically close to the first mobile device, and is lower than the priority of synchronization of the selected device when the second mobile device is located remotely from the first mobile device.

15. The method of claim 14, wherein the first mobile device is physically close to the second mobile device when the first mobile device is at a same location as the second mobile device, when the first mobile device is within direct short range wireless communication range of the second mobile device, or when the first mobile device is separated from the second mobile device by less than a predefined distance.

16. A computer system comprising:
- a processor;
- a communication interface coupled to the processor, through which to communicate with remote devices; and
- a storage device coupled to the processor, the storage device storing instructions which when executed by the processor cause the computer system to perform operations including:
- receiving an indication that a first instance of an application is being run at a first mobile device, the first mobile device being one of a plurality of devices that are associated with a user, the plurality of devices including a second mobile device;
- accessing the storage device to obtain user profile data associated with a user profile of the user, and to obtain proximity algorithm data that is associated a proximity-based synchronization algorithm and that is based on input from the user;
- performing an analysis based on the proximity-based synchronization algorithm, the proximity algorithm data, an indication of a location of one or more of the plurality of devices, and the user profile data to determine a priority of synchronization;
- determining to synchronize, based on the priority of synchronization, application state data of the first instance of the application, the application state data being data which represents a state of the first instance of the application;
- in response to the determination to synchronize the application state data, causing the application state data to be transferred from the first mobile device to the second mobile device to enable a second instance of the application to be initiated, based on the application state data, at the second mobile device; and
- receiving an indication that the first mobile device is at a first location, an indication that the second mobile device is at the first location, and an indication that a third device is at the first location, the third device being one of the plurality of devices,
- wherein said causing the application state data to be transferred from the first mobile device to the second mobile device is further in response to the priority of synchronization of the second mobile device being higher than the priority of synchronization of the third device.

17. The computer system of claim 16, wherein the first location is any of a residence, a business, or an area whose boundary is defined by a geo-fence.

18. The computer system of claim 16, wherein the proximity-based synchronization algorithm data indicates to prioritize, when the first mobile device, the second mobile device, and the third device are all at a same location, synchronizing the first mobile device to the second mobile device higher than synchronizing the first mobile device to the third device.

19. The computer system of claim 16, wherein said performing the analysis is further based on user history data that indicates historic usage by the user of any of the first mobile device, the second mobile device, or the third device, and wherein the user history data indicates that the user switches from the first mobile device to the second mobile device more often that the user switches from the first mobile device to the third device when the first mobile device, the second mobile device, and the third device are all at a same location.

* * * * *